(12) United States Patent
Deterre

(10) Patent No.: US 12,188,520 B2
(45) Date of Patent: Jan. 7, 2025

(54) INSERT FOR ROLLING BEARING

(71) Applicant: SAFRAN AIRCRAFT ENGINES, Paris (FR)

(72) Inventor: Geoffray Fernand Jacques Deterre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 86 days.

(21) Appl. No.: 18/015,476

(22) PCT Filed: Jul. 9, 2021

(86) PCT No.: PCT/FR2021/051287
§ 371 (c)(1),
(2) Date: Jan. 10, 2023

(87) PCT Pub. No.: WO2022/008857
PCT Pub. Date: Jan. 13, 2022

(65) Prior Publication Data
US 2023/0287932 A1    Sep. 14, 2023

(30) Foreign Application Priority Data

Jul. 10, 2020 (FR) ...................................... 2007351

(51) Int. Cl.
*F16C 33/38* (2006.01)
(52) U.S. Cl.
CPC ................. *F16C 33/3887* (2013.01)
(58) Field of Classification Search
CPC .... F16C 33/38; F16C 33/3831; F16C 33/385; F16C 33/3887
See application file for complete search history.

(56) References Cited

U.S. PATENT DOCUMENTS 3,390,928 A     7/1968  John et al.
5,230,570 A *   7/1993  Bursey, Jr. .......... F16C 33/3831
                                                    384/909
(Continued)

FOREIGN PATENT DOCUMENTS

CN    111425524 A  *  7/2020
EP    2006560 A2      12/2008
(Continued)

OTHER PUBLICATIONS

Translation of CN111425524A obtained May 28, 2024.*
(Continued)

*Primary Examiner* — James Pilkington
(74) *Attorney, Agent, or Firm* — Cozen O'Connor

(57) ABSTRACT

A rolling bearing assembly includes an inner ring and an outer ring that are coaxial about an axis of rotation and between which rolling elements are arranged. An annular metal rolling bearing cage is centered about the axis of rotation and arranged radially between the inner ring and the outer ring, the annular cage having recesses for retaining rolling elements, an outer annular face facing the outer ring, and an inner annular face facing the inner ring. At least one insert at least one tubular portion engaged in a recess of the annular cage, a tubular portion of the insert being connected at one radial end to a rim arranged in abutment against the inner annular face or the outer annular face of the annular cage. A latching means on the insert cooperates with a latching means in the annular cage to hold the insert in a recess.

8 Claims, 4 Drawing Sheets

(56) References Cited

U.S. PATENT DOCUMENTS

| | | | | |
|---|---|---|---|---|
| 7,832,938 B2* | 11/2010 | McKeirnan, Jr. | ..... | F16C 35/077 |
| | | | | 417/407 |
| 8,113,718 B2* | 2/2012 | Ito | ......... | F04D 29/049 |
| | | | | 384/527 |
| 9,657,779 B2* | 5/2017 | Kokumai | ............ | B29C 45/0025 |
| 2008/0019623 A1* | 1/2008 | Otsuka | ................ | F16C 33/4611 |
| | | | | 384/51 |
| 2016/0108965 A1 | 4/2016 | Kokumai et al. | | |

FOREIGN PATENT DOCUMENTS

| | | | |
|---|---|---|---|
| JP | 2003232363 A | 8/2003 | |
| JP | 2009024821 A | 2/2009 | |

OTHER PUBLICATIONS

International Patent Application No. PCT/FR2021/051287, International Search Report and Written Opinion dated Sep. 6, 2021, 7 pgs.
French Patent Application No. FR2007351; Search Report dated Mar. 23, 2021; 8 pgs.

\* cited by examiner

[Fig. 1]
PRIOR ART
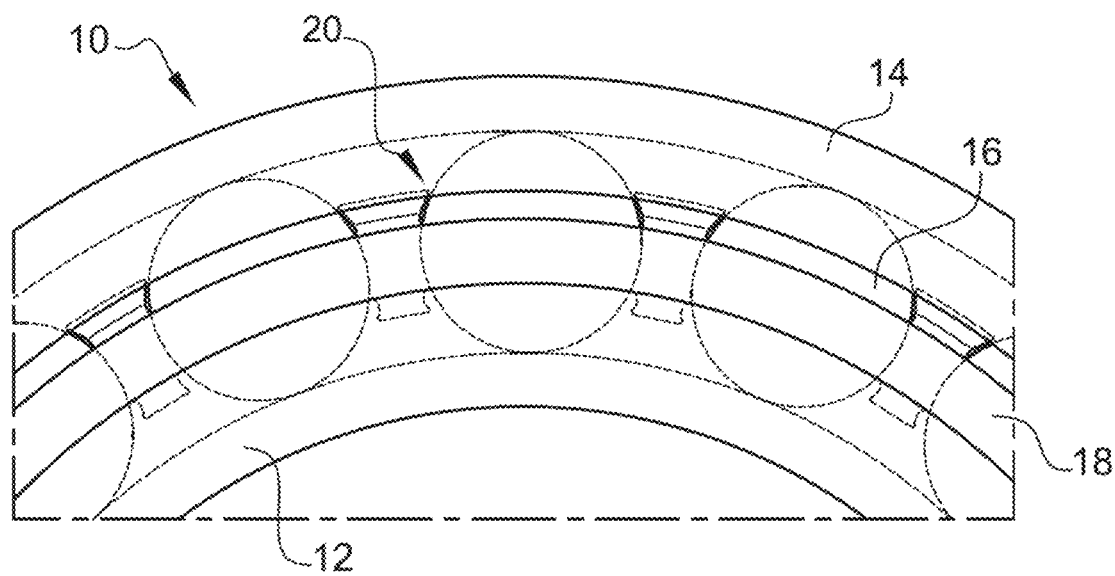
[Fig. 2]
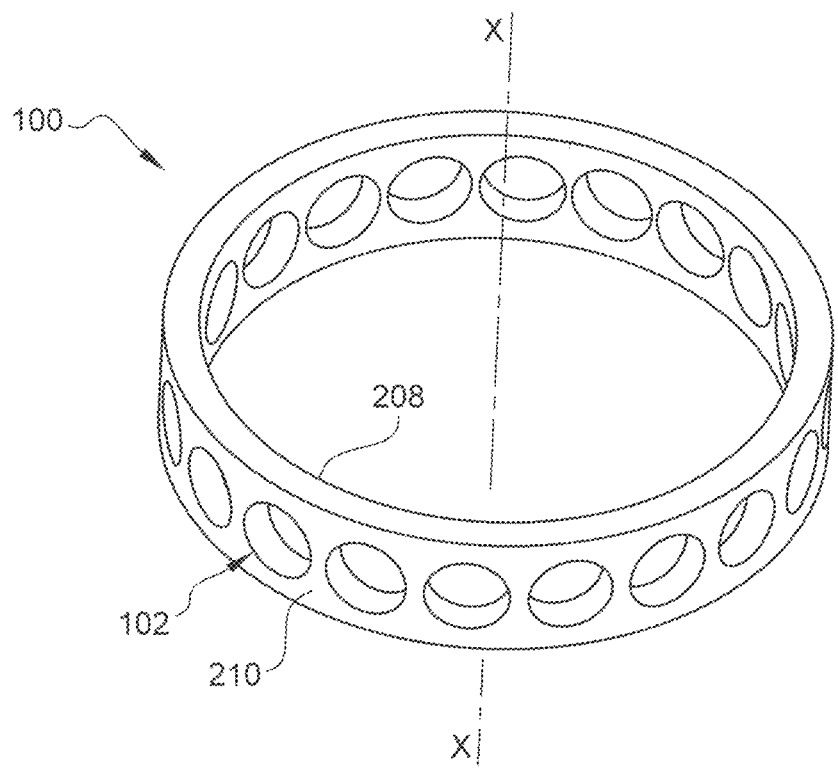

[Fig. 3]
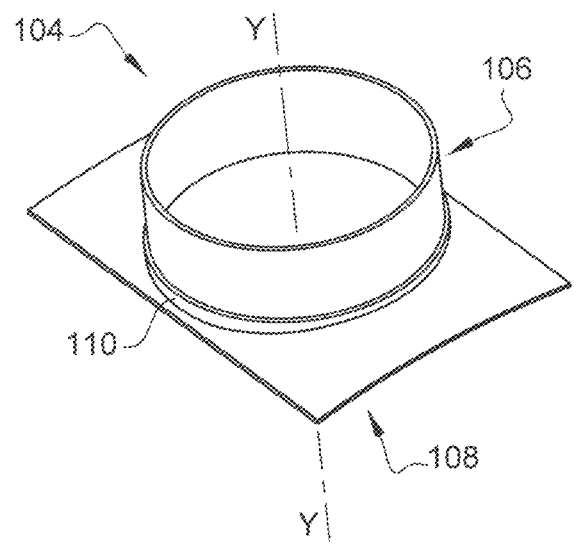
[Fig. 4]
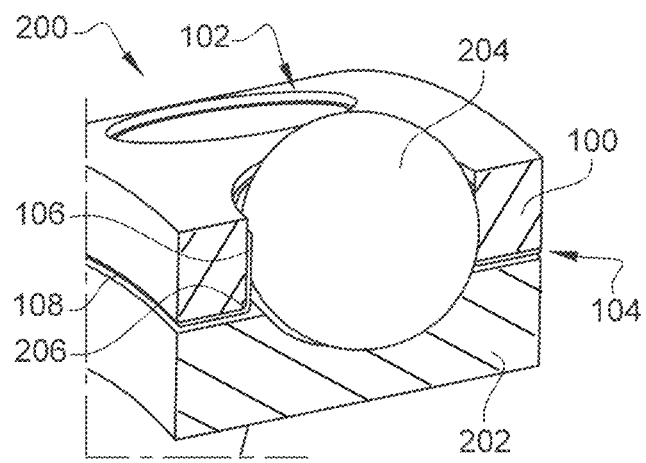

INSERT FOR ROLLING BEARING

CROSS-REFERENCE TO RELATED APPLICATIONS

This application is a 35 U.S.C. § 371 filing of International Application No. PCT/FR2021/051287 filed Jul. 9, 2021, which claims the benefit of priority to French Patent Application No. FR2007351 filed Jul. 10, 2020, each of which is incorporated herein by reference in its entirety.

TECHNICAL FIELD OF THE INVENTION

The present invention relates to the field of rolling bearings, in particular for a turbomachine.

PRIOR ART

Bearings are known for ensuring the axial and radial positioning of the shafts of turbomachines or other rotating machines and ensuring the transmission of forces between fixed and rotating parts or between parts rotating at different speeds. An example of a rolling bearing 10 is shown in FIG. 1. The rolling bearing 10 comprises an inner ring 12 and an outer ring 14 that are coaxial along an axis of rotation X of the bearing 10 and extending annularly, the inner ring 12 being intended to be mounted around a shaft. The rolling bearing 10 comprises rolling elements 16 distributed circumferentially around the axis X between the inner ring 12 and the outer ring 14. In order to ensure a uniform circumferential distribution of the rolling elements 16, the rolling bearing 10 comprises an annular cage 18 in which the rolling elements 16 are arranged. The annular cage 18 comprises a plurality of recesses 20 receiving the rolling elements 16. The annular cage 18 is made of metal, for example steel, aluminium, bronze, etc., in order to ensure a high mechanical strength of the bearing 10. However, the tribological properties of these materials, such as the resistance to friction, remains limited, which reduces their lifespan. A solution for improving the tribological properties of the annular cage 18 consists in producing it from a material such as polyether ether ketone which is known for its tribological properties. However, such a material has a low mechanical strength compared with steel, which risks damage to the bearing, in particular when it is subjected to high loads.

The present invention proposes a rolling bearing having better mechanical strength and better tribological behaviour.

The present invention aims to provide a rolling bearing with an improved lifespan suitable for a turbomachine.

SUMMARY OF THE INVENTION

For this purpose, the present invention relates to a rolling bearing assembly comprising:
- an inner ring and an outer ring that are coaxial about an axis of rotation and between which rolling elements are arranged,
- an annular metal rolling bearing cage centred about the axis of rotation and arranged radially between the inner ring and the outer ring, the annular cage having an outer annular face facing the outer ring and an inner annular face facing the inner ring, and
- at least one insert comprising at least one tubular portion engaged in a recess of the annular cage and receiving one of the rolling elements, the tubular portion being connected at one radial end to a rim arranged in abutment against the inner annular face or the outer annular face of the annular cage.

The bearing assembly is provided with inserts, preferably made of plastic, arranged on the one hand between the rolling elements and the walls of the recesses of the annular cage and, on the other end, radially between the annular cage and the inner ring or the outer ring. Hence, when the bearing assembly is in rotation, the rolling elements are mainly in contact with the insert. Likewise, the annular cage is not in contact with the inner ring or the outer ring during rotation of the bearing assembly. Since plastic has a better resistance to friction, the wear of the annular cage and of the inner and outer rings is limited. This also improves the longevity of the bearing assembly. Moreover, the bearing assembly comprises an annular cage which can be made of metal, which ensures the resistance to shock and mechanical strength of the bearing assembly. Such a rolling bearing assembly is therefore suitable for use in a turbomachine.

The tubular portion can have different shapes. The tubular portion may have a cylindrical shape or an oblong shape suitable for rolling elements of the rolling ball type. The tubular portion may have a rectangular cross-section in a plane tangential to the annular cage, i.e. perpendicular to a radial axis of the annular cage passing through the tubular portion. In other words, the tubular portion may have a rectangular cross-section in a plane perpendicular to an axis of the tubular portion. The axis of the tubular portion can be co-linear with a radial axis of the annular cage when the tubular portion is mounted in the annular cage.

Each insert may comprise a single tubular portion, an insert being associated with each recess of the annular cage. At least one insert may comprise a plurality of tubular portions, which are connected to the same single rim. Hence, it is possible to mount a plurality of tubular portions simultaneously in a plurality of recesses of the annular cage.

The rim of an insert can be produced in various ways. The rim of at least one, in particular each, insert can have a shape that is complementary to the shape of the inner annular face or outer annular face of the annular cage against which said rim is applied. This complementary shape can be curved around the axis of rotation. The rim of at least one, in particular each, insert can deform to match the shape of the inner annular face or outer annular face of the annular cage against which said rim is applied. The rim of at least one, in particular each, insert can have a substantially planar shape.

The annular cage can be made of steel, silver steel, bronze, aluminium, etc.

At least one, in particular each, insert can be made of polyether ether ketone, also known by the term PEEK. Such a material has a better resistance to friction than steel, for example.

The bearing assembly can be sized to be arranged in a turbomachine. For example, the diameter of the inner ring or outer ring can be greater than 60 mm and the diameter of a recess can be greater than 80 mm.

The annular cage and at least one insert can be assembled in various ways. At least one, in particular each, insert may comprise a first latching means and the annular cage may comprise a second latching means, the first latching means cooperating with the second latching means in order to hold the tubular portion of said insert engaged in a recess of the annular cage.

The first latching means of at least one, in particular each, insert may comprise an annular portion projecting radially from the tubular portion of said insert, towards the outside with respect to the axis of the recess housing said tubular portion. The second latching means may comprise a first shoulder radially facing the first latching means and, more particularly, facing said projecting annular portion. The term "axis of the recess" shall mean a radial axis of the annular cage passing through a centre of said recess, for example for a recess in revolution, the axis of the recess may correspond to the axis of revolution of said recess. More generally, it involves the axis of the cylinder forming the recess.

The projecting annular portion may be in the form of a collar.

The tubular portion of an insert may have an outer diameter substantially equal to the inner diameter of the recess housing said tubular portion of an insert. The projecting annular portion may have an outer diameter greater than the inner diameter of the recess which can be substantially equal to the inner diameter of the first shoulder.

The first shoulder can open onto an annular face of the cage opposite the annular face in contact with the rim of the insert. The mouth of the first shoulder in the recess may comprise a radial cylindrical surface with an inner diameter equal to the outer diameter of the projecting portion.

The tubular portion of at least one, in particular each, insert may comprise an annular portion formed opposite the rim of said insert with respect to the first latching means, this annular portion being able to be inserted, without deformation, into a second shoulder of the recess, the second shoulder opening onto the inner or outer face on which the rim of the insert is applied.

The second shoulder can have an inner diameter substantially equal to the outer diameter of the annular portion.

The present invention further relates to a turbomachine, such as a turboprop engine or a turbojet engine, comprising a rolling bearing assembly as mentioned above.

The term "turbomachine" designates all gas turbine devices producing motive power, among which it is possible to distinguish, in particular, between turbojet engines providing a thrust necessary for propulsion by reaction to the ejection at high speed of hot gases, and turboshaft engines in which the motive power is provided by the rotation of a motor shaft. For example, turboshaft engines are used as engines for helicopters, ships, trains, or even as industrial motors. Turboprop engines (turboshaft engine driving a propeller) are also turboshaft engines used as aircraft motors.

Unless specified otherwise, the adjectives interior/inner and exterior/outer used with reference to a radial direction such that interior/inner (i.e. radially interior) portion of an element is closer to the axis of the element than the exterior/outer (i.e. radially exterior) portion of the same element.

BRIEF DESCRIPTION OF THE FIGURES

FIG. 1, which has already been described, shows a rolling bearing known from the prior art, in a side view.

FIG. 2 shows a rolling bearing annular cage in a perspective view, equipped with a first insert example.

FIG. 3 shows the first insert example for an annular cage.

FIG. 4 shows a partial perspective view of the annular cage of FIG. 2.

DETAILED DESCRIPTION OF THE INVENTION

Figure 5:
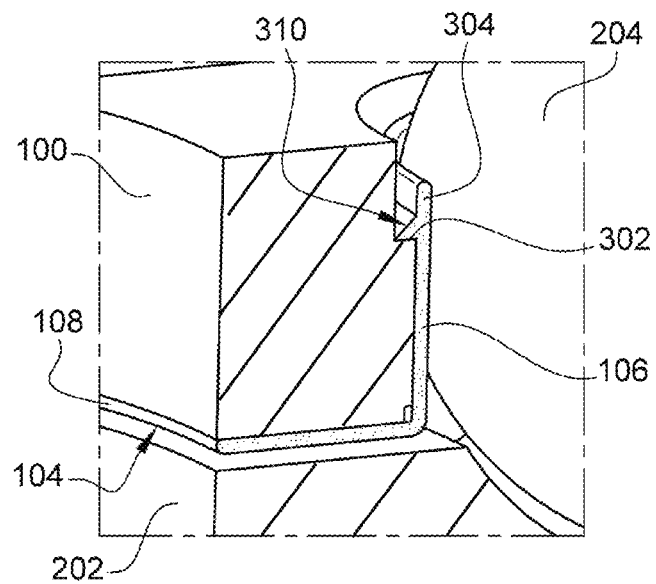
FIG. 5 shows a partial perspective view of an annular cage equipped with a second insert example.

With reference to FIGS. 2 to 4, the annular cage 100 is intended to be incorporated in a rolling bearing, for example the rolling bearing 10 of FIG. 1, in place of the annular cage 18, or in a bearing 200 of FIG. 4.

The annular cage 100 comprises a plurality of recesses 102 able to receive rolling elements 204. The recesses 102 are distributed circumferentially about an axis of rotation X of the annular cage 100. The recesses 102 can, for example, have a cylindrical shape.

The annular cage 100 is metallic, for example made of steel.

The annular cage 100 has an inner annular face 208 turned towards the axis of rotation X and configured to be facing an inner ring 202 of the bearing 200 and an outer annular face 210 opposite the inner annular face 208 and configured to be facing an outer ring, not shown in the figures, of the bearing 200.

Each recess 102 is associated with an insert 104 made of plastic material, for example polyether ether ketone. The insert 104 comprises a tubular portion 106 having an axis of revolution Y. For example, the tubular portion can be cylindrical. The tubular portion 106 is sized to be arranged in a recess 102. For example, the outer diameter of the tubular portion 106 can be equal to or substantially greater than the inner diameter of the recess 102. The insert 104 further comprises a rim 108 surrounding the tubular portion 106 and connected to the latter at an annular junction 110 which comes into abutment against an end 206 of the recess 102. The rim 108 has a surface with a shape complementary to the shape of the inner annular face 208 of the annular cage 100.

Of course, the rim 108 of the insert 104 can have a shape complementary to the shape of the outer annular face 210 in the case where the insert 104 is arranged between the annular cage 100 and the outer ring of the bearing 200.

The rolling element 204 is arranged in the tubular portion 106 such that the rolling element 204 is not subject to friction with the annular cage 100. Since the plastic insert has a better resistance to friction, the lifespan of the bearing 200 is improved.

Alternatively, the insert 104 can comprise a plurality of tubular portions 106 distributed over a single rim 108 so that the insert 104 is configured to be arranged in a plurality of recesses 102.

Figure 6:
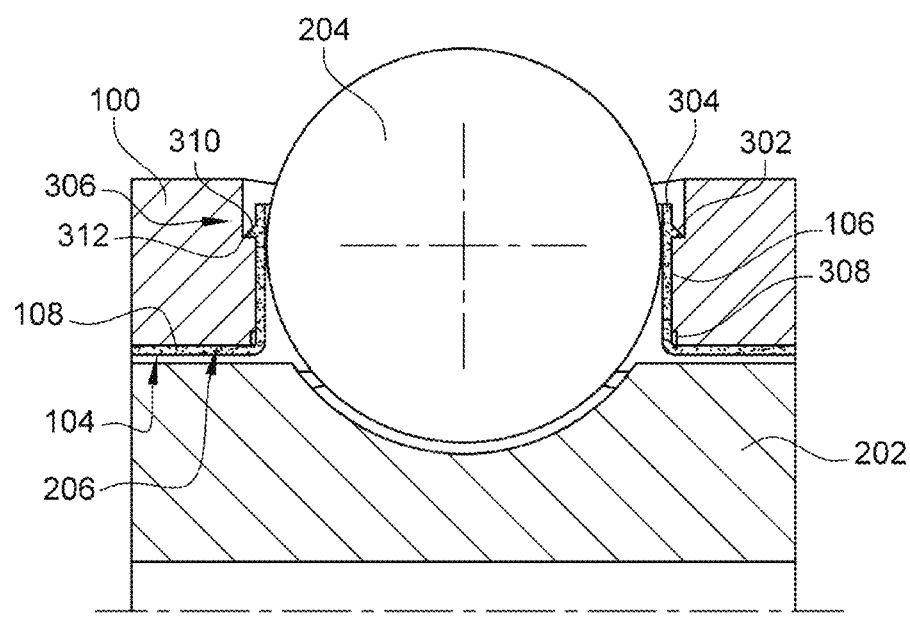
FIG. 6 shows an axial section of an annular cage equipped with the second insert example.
Figure 7:
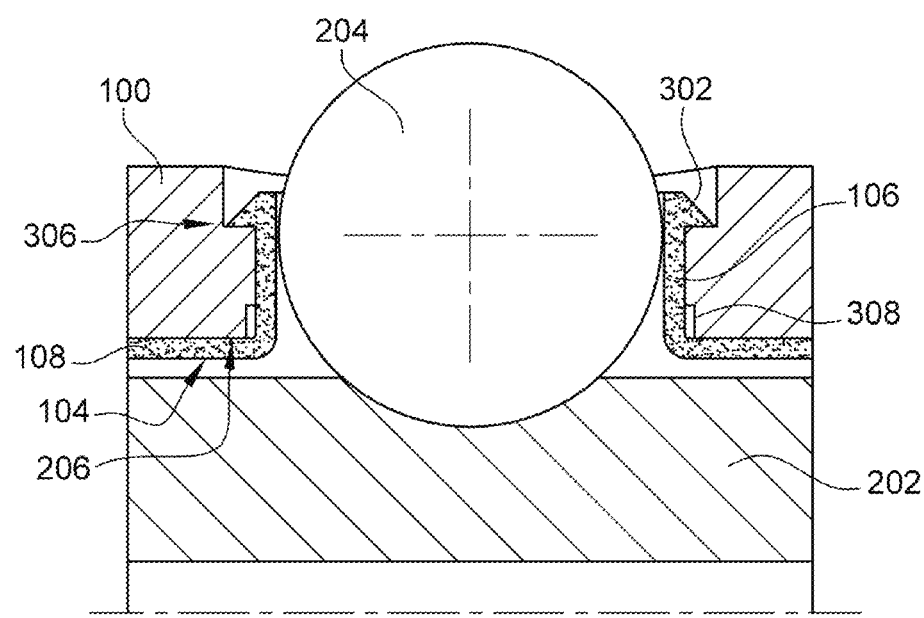
FIG. 7 shows an axial section of an annular cage equipped with a third insert example.

With reference to FIGS. 5 to 7, the insert 104 includes a first latching means that cooperates with a second latching means in the recess 102. In embodiments, the first latching means is also referred to as a latching collar 302 cooperating with a first shoulder 306, also referred to as the second latching means, and is provided in the recess 102 in order to radially block the insert 104 in the recess 102. The collar 302 projects radially from the outer face of the tubular portion 106 towards the outside from the axis Y of the tubular portion 106. The collar 302 can have a diameter greater than the inner diameter of the recess 102 and equal to the inner diameter of the first shoulder 306. The tubular portion 106 is thus inserted in the recess 102 by elastic deformation towards its axis Y. When the collar 302 reaches the shoulder 306, the tubular portion 106 resumes its initial shape, the collar 302 is then in abutment against the shoulder 306 which blocks the movement of the insert along the axis Y of the tubular portion.

The alternative of the insert shown in FIG. 6 comprises means for centring the annular portion 106 in view of its insertion in the recess 102.

For this purpose, a second shoulder 308 is provided in the recess 102 on the side of its end 206.

The tubular portion 106 also comprises an annular portion 304 having an outer diameter substantially equal to the inner diameter of the second shoulder 308. The annular portion 304 is arranged adjacent to the collar 302 on the side of an end of the tubular portion 106 opposite the rim 108 with respect to the collar 302. The collar 302 also has a first surface 310 inclined with respect to the axis Y of the tubular portion in the direction of the rim 108 and a second surface 312 perpendicular to the axis Y.

Hence, in order to mount the insert 104 in the recess 102, the annular portion 304 is positioned in the second shoulder 308, which enables centring of the tubular portion 106 in the recess 102. A force on the insert 104 along the axis Y of the tubular portion 106 causes deformation of the tubular portion 106 by sliding the first surface 310 into the shoulder 308. The mounting of the insert 104 in the recess 102 is thus facilitated.

The first shoulder 306 opens onto an annular face of the cage opposite the annular face in contact with the rim 108 of the insert 104, i.e. opposite the end 206. The mouth of the first shoulder in the recess 102 comprises a cylindrical radial surface having an inner diameter equal to the outer diameter of the collar 302.

This arrangement makes it possible to dismantle the insert 104 more simply. More specifically, it enables direct access to the latching means from the mouth of the shoulder 306. It is sufficient to withdraw the outer ring and the rolling element in order to disengage the insert 104.

The invention claimed is:

1. A rolling bearing assembly comprising:
   an inner ring and an outer ring that are coaxial about an axis of rotation and between which rolling elements are arranged,
   an annular metal rolling bearing cage centered about the axis of rotation and arranged radially between the inner ring and the outer ring, the annular cage having an outer annular face facing the outer ring and an inner annular face facing the inner ring, and
   at least one insert comprising at least one tubular portion engaged in a recess of the annular cage and receiving one of the rolling elements, the tubular portion being connected at one radial end to a rim arranged in abutment against the inner annular face or the outer annular face of the annular cage,
   wherein the at least one insert comprises a first latching means and the annular cage comprises a second latching means, the first latching means cooperating with the second latching means in order to hold the tubular portion of said insert housed in the annular cage, and
   the first latching means of the at least one insert comprises a collar projecting radially from the tubular portion of said at least one insert towards the outside with respect to the axis of the recess comprising said tubular portion of said at least one insert, and the second latching means comprises a first shoulder radially facing said projecting collar,
   wherein the tubular portion of the at least one insert comprises an annular portion formed opposite the rim of said insert, the annular portion being able to be inserted without deformation into a second shoulder of the recess, the second shoulder opening onto the inner annular face or outer annular face on which the rim of the insert is applied;
   wherein the first shoulder opens onto an annular face of the annular cage opposite the annular face in contact with the rim of the insert, the first shoulder being arranged between the annular portion and the rim.

2. The assembly according to claim 1, wherein the tubular portion of the at least one insert is cylindrical.

3. The assembly according to claim 1, wherein said at least one insert comprises a single tubular portion, and wherein an insert is associated with each recess of the annular cage.

4. The assembly according to claim 1, wherein the rim of the at least one insert has a shape that is complementary to the shape of the inner annular face or outer annular face of the annular cage against which said rim is applied.

5. The assembly according to claim 4, wherein the second shoulder has an inner diameter substantially equal to the outer diameter of the annular portion.

6. The assembly according to claim 1, wherein the insert is made of polyether ether ketone.

7. The assembly according to claim 1, wherein the second shoulder has an inner diameter substantially equal to the outer diameter of the annular portion.

8. A turbomachine comprising an assembly according to claim 1.

* * * * *